(12) United States Patent
Lundgren

(10) Patent No.: US 11,930,783 B2
(45) Date of Patent: Mar. 19, 2024

(54) RELEASABLE SECURING ARRANGEMENT FOR SECURING A MOVEABLE OBJECT

(71) Applicant: Equimade AB, Södra Sandby (SE)

(72) Inventor: Rachel Lundgren, Södra Sandby (SE)

(73) Assignee: Equimade AB, Södra Sandby (SE)

( * ) Notice: Subject to any disclaimer, the term of this patent is extended or adjusted under 35 U.S.C. 154(b) by 0 days.

(21) Appl. No.: 16/885,506

(22) Filed: May 28, 2020

(65) Prior Publication Data

US 2021/0007322 A1  Jan. 14, 2021

(30) Foreign Application Priority Data

May 29, 2019 (SE) .................................. 1950638-5

(51) Int. Cl.
*A01K 1/04* (2006.01)
*B68B 1/00* (2006.01)

(52) U.S. Cl.
CPC . *A01K 1/04* (2013.01); *B68B 1/00* (2013.01)

(58) Field of Classification Search
CPC ... A01K 1/04; A01K 1/06; A01K 3/00; A01K 27/005; B68B 1/00
See application file for complete search history.

(56) References Cited

U.S. PATENT DOCUMENTS

| | | |
|---|---|---|
| 219,030 A | 8/1879 | De St Aubin |
| 1,083,836 A | 1/1914 | Saffold |
| 5,099,799 A * | 3/1992 | Giacobbe ............... A01K 27/00 119/106 |

(Continued)

FOREIGN PATENT DOCUMENTS

| | | |
|---|---|---|
| DE | 29720127 U1 | 1/1998 |
| DE | 102007036291 A1 | 2/2009 |

(Continued)

OTHER PUBLICATIONS

Swedish Patent and Registration Office, Search Report, Patent Application No. 1950638-5. dated Nov. 27, 2019, 12 pages.

(Continued)

*Primary Examiner* — Joshua J Michener
*Assistant Examiner* — Henry Hooper Mudd
(74) *Attorney, Agent, or Firm* — Nordic Patent Service

(57) ABSTRACT

A releasable securing arrangement for securing a moveable object. A hook arrangement is attached to the moveable object. A releasable connection is attached to a fixed object. A strap extends between the hook arrangement and the releasable connection. The hook arrangement is attached to a first end section of the strap. The releasable connection is attached to a second end section of the strap. The releasable connection includes first and second interlocking parts, the first interlocking part being longitudinally spaced from the second interlocking part along the strap. A foldable strap area extends between the first interlocking part and the second interlocking part to enclose the fixed object, the first and second interlocking parts meeting and interlocking at one side of the fixed object. The interlocked first and second interlocking parts separate when force applied onto the releasable connection by the moveable object exceeds a predetermined force limit.

12 Claims, 2 Drawing Sheets

(56) References Cited

U.S. PATENT DOCUMENTS

| | | | | |
|---|---|---|---|---|
| 5,176,106 | A * | 1/1993 | Casto | A01K 27/00 |
| | | | | 119/106 |
| 5,785,011 | A * | 7/1998 | Gitterman | A01K 27/00 |
| | | | | 119/865 |
| 6,318,301 | B1 | 11/2001 | Jackson et al. | |
| 8,292,341 | B1 * | 10/2012 | Sokoly | A45F 5/00 |
| | | | | 294/152 |
| 2004/0211371 | A1 * | 10/2004 | Schofield | A01K 1/08 |
| | | | | 119/772 |
| 2011/0000440 | A1 * | 1/2011 | Mucerino | A01K 27/00 |
| | | | | 119/709 |
| 2013/0167782 | A1 | 7/2013 | Poch | |
| 2016/0007572 | A1 | 1/2016 | Aked-Hurditch | |
| 2016/0015002 | A1 | 1/2016 | Huegel et al. | |
| 2016/0295837 | A1 * | 10/2016 | Pach | A01K 27/001 |
| 2017/0042124 | A1 * | 2/2017 | Cooper | A01K 27/00 |
| 2017/0280686 | A1 * | 10/2017 | Cory | A01K 27/00 |
| 2018/0199547 | A1 * | 7/2018 | Moore | A01K 27/00 |

FOREIGN PATENT DOCUMENTS

| | | |
|---|---|---|
| GB | 2039705 A | 8/1980 |
| GB | 2458668 A | 9/2009 |
| WO | 2015185873 A1 | 12/2015 |

OTHER PUBLICATIONS

European Patent Office, Extended European Search Report, Application No. 20177103.7, dated Sep. 30, 2020, 9 pages.

Swedish Patent and Registration Office, Swedish Search Report, Application No. 1950638-5, dated Nov. 27, 2019, 12 pages.

* cited by examiner

RELEASABLE SECURING ARRANGEMENT FOR SECURING A MOVEABLE OBJECT

TECHNICAL FIELD

The disclosure relates to a releasable securing arrangement for securing a moveable object, comprising a hook arrangement to be attached to the moveable object, a releasable connection to be attached to a fixed object, and a strap extending between the hook arrangement and the releasable connection.

BACKGROUND

Animals such as horses are prone to panicking when being scared or surprised while being restrained, e.g., in a trailer or in a stable. In order to alleviate the panic, the animal has to be released and/or able to move more freely. For the safety of the animal, and its surroundings, in particular in the case of a larger animal, safety equipment such as safety hooks which are easily released with one hand, so called panic snaps, are used for headropes, tie-ups etc. However, such safety hooks have to be opened manually, forcing individuals to get very close to the panicking animal in order to be able release it, and hence, put oneself at risk of being injured by the animal.

SUMMARY

The aspects of the disclosed embodiments are directed to providing an improved securing arrangement for securing a moveable object.

The foregoing and other objects are achieved by the features of the independent claim. Further implementation forms are apparent from the dependent claims, the description, and the figures.

According to a first aspect, there is provided a releasable securing arrangement for securing a moveable object, comprising a hook arrangement to be attached to the moveable object, a releasable connection to be attached to a fixed object, a strap extending between the hook arrangement and the releasable connection, the hook arrangement being attached to a first end section of the strap, the releasable connection being attached to an opposite, second end section of the strap, the releasable connection comprising at least first and second interlocking parts, the first interlocking part being longitudinally spaced from the second interlocking part along the strap, a foldable strap area extending between the first interlocking part and the second interlocking part, the foldable strap area being adapted for enclosing the fixed object, and the first and second interlocking parts being adapted for meeting and interlocking at one side of the fixed object, the interlocked first and second interlocking parts being configured to separate when force applied onto the releasable connection, by the moveable object, exceeds a predetermined force limit.

This solution allows a moveable object, e.g. an animal such as a horse, to be released as soon as force applied onto the releasable connection exceeds a certain limit, by means of the first and second interlocking parts separating automatically. There is no need for a human to get too close to the animal, e.g. within a tight space such as a horse box or trailer since the connection releases automatically. Furthermore, the hook arrangement and the strap remain attached to the horse, making it significantly easier to catch, and subsequently maintain the grip on, the loose horse.

In a possible implementation form of the first aspect, the second end section of the strap comprises a strap loop, allowing a user to easily and securely grasp the second end section of the strap in order to open or close the releasable connection, with one hand if so desired.

In a further possible implementation form of the first aspect, the releasable securing arrangement further comprises a protective cover enclosing at least the first end section of the strap, providing sound-dampening as well protection against wear caused by, e.g., a horse fretting on the first end section.

In a further possible implementation form of the first aspect, the protective cover comprises shrink wrap.

In a further possible implementation form of the first aspect, the releasable securing arrangement further comprises a three-dimensional body arranged along the first end section of the strap, providing a sound dampening effect to the releasable securing arrangement as well as preventing the horse from fretting at the strap.

In a further possible implementation form of the first aspect, the three-dimensional body is made of elastic material.

In a further possible implementation form of the first aspect, the first and second interlocking parts of the releasable connection unlock at a shear force of 650 N±20%, allowing even a large moving animal such as a horse to be restrained until a particular shear force level, and therewith associated animal stress level, has been exceeded.

In a further possible implementation form of the first aspect, the releasable connection comprises a hook-and-loop fastener, which not only provides a simple yet strong interconnection, but also generates a noise as the releasable connection opens, which noise tends to sooth a panicked horse.

In a further possible implementation form of the first aspect, the releasable connection comprises a first permanent magnet and at least one of a second permanent magnet and a magnetic material, providing a very durable and small releasable connection, which is not affected by, e.g., dust or hair.

In a further possible implementation form of the first aspect, the hook arrangement comprises a safety hook, allowing the hook arrangement to be easily attached to e.g. the horse's halter.

In a further possible implementation form of the first aspect, the releasable connection generates a sound when the interlocked first and second interlocking parts separate. This, for the animal unexpected, sound functions as a distraction to the panicking animal, helping to calm the animal down.

This and other aspects will be apparent from the embodiments described below.

BRIEF DESCRIPTION OF THE DRAWINGS

In the following detailed portion of the present disclosure, the aspects, embodiments, and implementations will be explained in more detail with reference to the example embodiments shown in the drawings, in which.

DETAILED DESCRIPTION

Figures 1, 2:
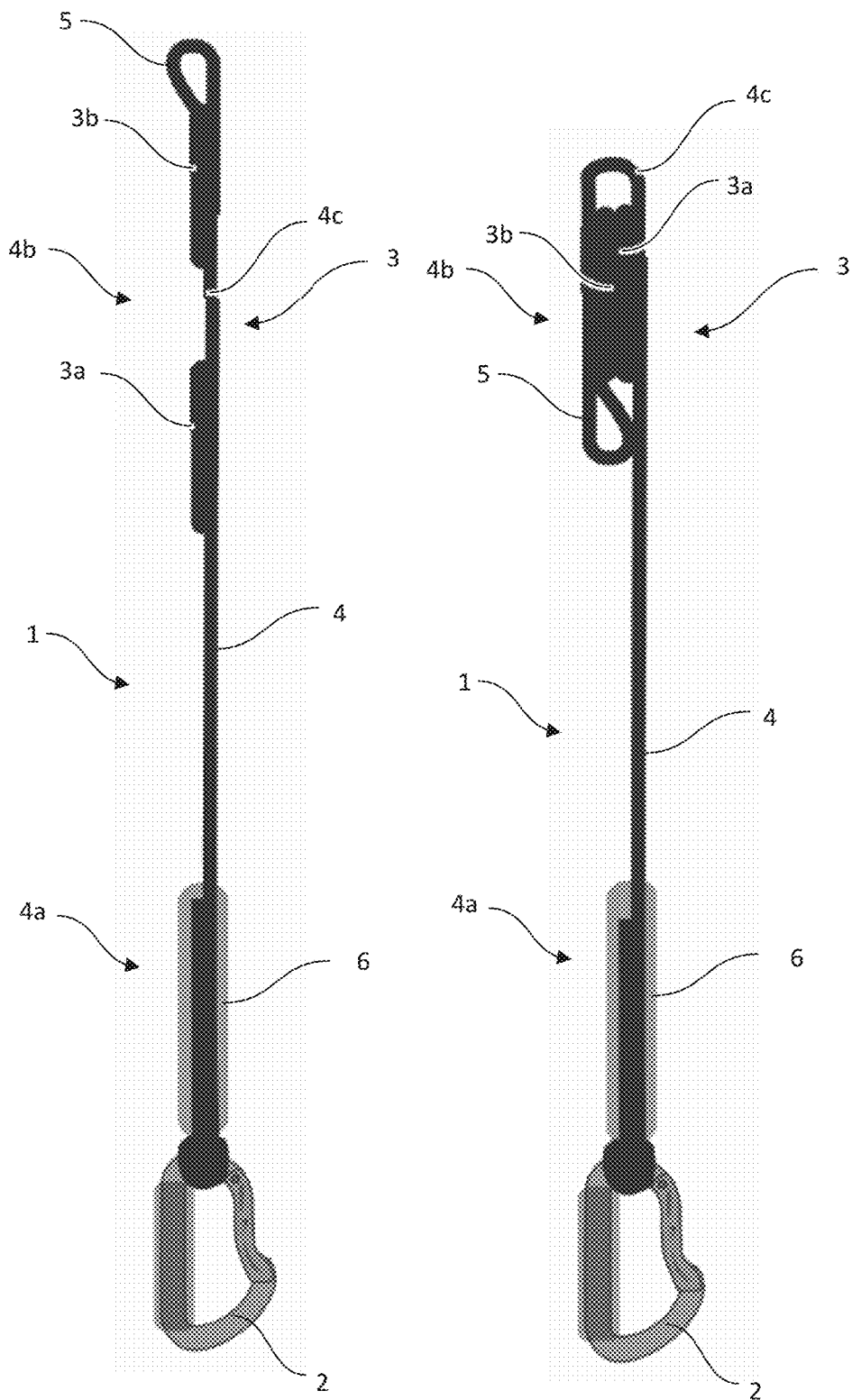
FIG. 1 shows a schematic side view of a releasable securing arrangement in accordance with one embodiment of the present invention, with the releasable connection of the releasable securing arrangement in an open configuration.
FIG. 2 shows the embodiment of FIG. 1, with the releasable connection of the releasable securing arrangement in a closed configuration.
Figures 3, 4:
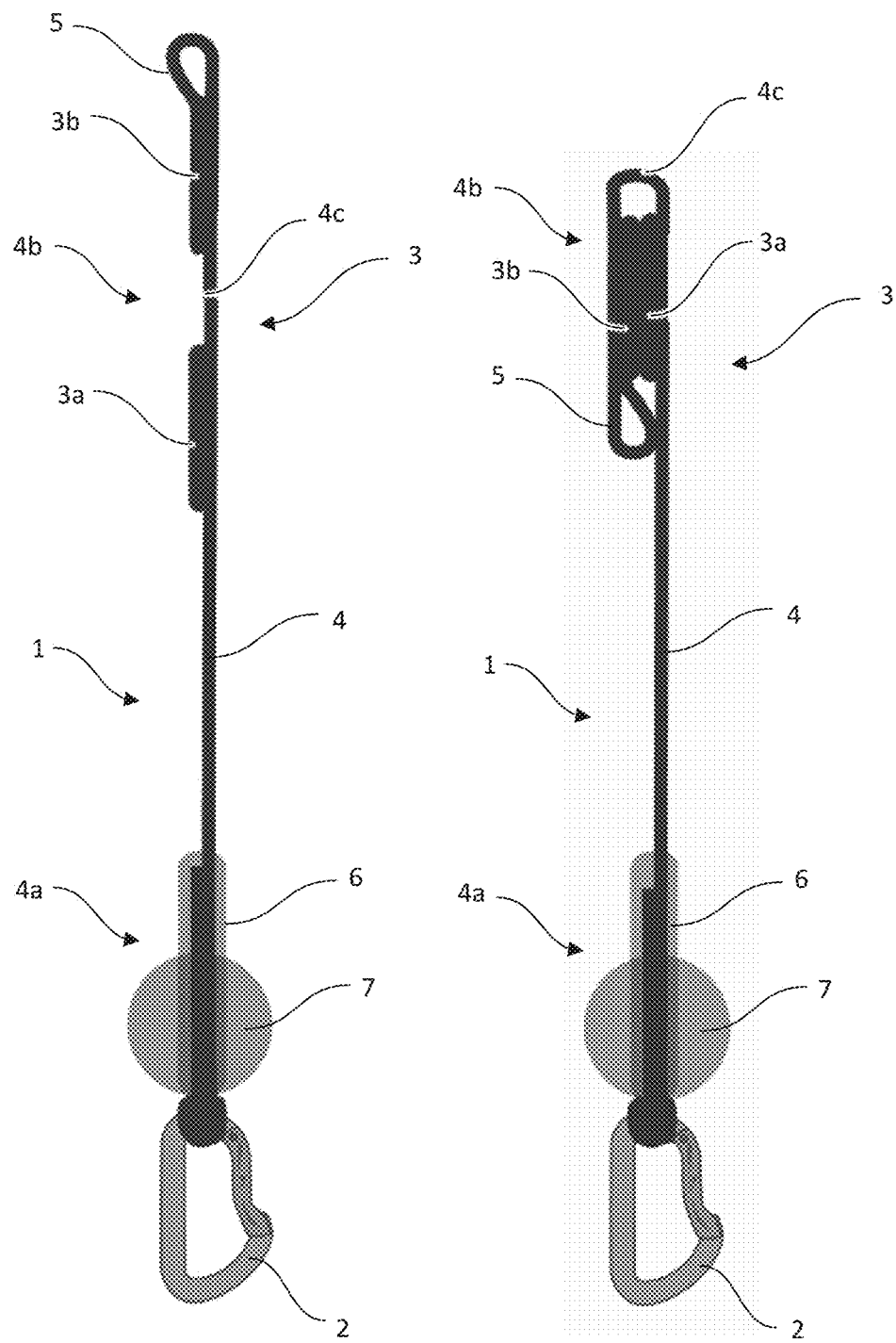
FIG. 3 shows a schematic side view of a releasable securing arrangement in accordance with a further embodiment of the present invention, with the releasable connection of the releasable securing arrangement in an open configuration.
FIG. 4 shows the embodiment of FIG. 3, with the releasable connection of the releasable securing arrangement in a closed configuration.

FIGS. 1 and 2 show one embodiment of a releasable securing arrangement 1 for securing a moveable object, preferably an animal, in particular a large animal such as a horse which can apply a significant amount of force onto a securing arrangement, to a fixed object such as a post, a wall bracket, stall grating, or some other type of fixed object. The release may be executed automatically or manually, i.e. by means of some other object or by hand. FIGS. 3 and 4 show a further embodiment of a releasable securing arrangement 1 for securing such a moveable object. FIGS. 1 and 3 show the embodiments in an open configuration, and FIGS. 2 and 4 show the embodiments in a closed configuration, i.e. the releasable securing arrangement 1 as it looks when secured to a fixed object. The fixed object will, in the closed configuration, extend through an opening formed by a foldable strap area 4c, discussed in more detail below.

The releasable securing arrangement 1 comprises a releasable connection 3 to be attached to a fixed object, an openable and closable hook arrangement 2 to be releasably attached to, e.g., the halter of a horse, and a strap 4 extending between the hook arrangement 2 and the releasable connection 3. The hook arrangement 2 is attached to a first end section 4a of the strap 4, and the releasable connection 3 is attached to an opposite, second end section 4b of the strap 4, such that a section of strap 4 extends freely between the first 4a and second 4b end sections.

The FIGS. show embodiments wherein the hook of the hook arrangement 2 is connected directly to the strap 4, by means of the first end section 4a of the strap 4, e.g., being wound around the base of the hook. The hook arrangement may, however, comprise a separate loop connected, preferably pivotally, to the base of the hook, through which loop the first end section 4a of the strap 4 may extend (not shown).

The hook arrangement 2 may comprise a safety hook, also known as snap hook or carabiner. The safety hook preferably comprises an open loop and a pivotable leg adapted for closing the open loop. The leg may be spring loaded or comprise a threaded arrangement for interlocking with the open loop when closing. The pivotable leg of the hook arrangement 2 may be curved in order to facilitate attachment to, e.g., the horse's halter. The hook arrangement 2 may also comprise a conventional panic snap in which a slidable section of the panic snap is pulled in a direction towards the strap, when the force applied exceeds a particular limit and the panic snap is closed, such that a pivotable leg is released from the slidable section and the panic snap automatically opened.

The releasable connection 3 comprises at least first 3a and second 3b interlocking parts.

The first interlocking part 3a is longitudinally spaced from the second interlocking part 3b along the strap 4 such that a foldable strap area 4c extends between the first interlocking part 3a and the second interlocking part 3b. The foldable strap area 4c is adapted for being wound around a fixed object such as the above-mentioned post or wall bracket. The foldable strap area 4c, more specifically. the longitudinal spacing between the first interlocking part 3a and the second interlocking part 3, may be significantly smaller than the length of the strap 4, restricting the use of the releasable securing arrangement 1 to fixed objects in the form of hollow hooks and rings. This allows the total length of the strap 4 to be very limited, avoiding unnecessary lengths of strap 4 which may cause entangling. The releasable connection 3 may comprise of more than two interlocking parts, in which case all such interlocking parts are preferably longitudinally spaced from adjacent interlocking parts, along the strap 4, such that one foldable strap area 4c extends between every pair of adjacent interlocking parts. The first interlocking part 3a is located closer to the hook arrangement 2 than the other interlocking part(s). The releasable connection 3 does not break when releasing and is, therefore, repeatedly reusable.

The strap 4 is made of any suitable, flexible, durable, and lightweight material such as rope or webbing made of polyamide and/or polyester, and is easily doubled over, at least in the foldable strap area 4c, such that the first 3a and second 3b interlocking parts of the releasable connection 3 can come into contact and interlock.

The foldable strap area 4c is preferably wound once around the fixed object. The first 3a and second 3b interlocking parts hence meet and interlock at one side of the fixed object. This allows the second end section 4b of the strap 4 to be connected also through small openings. Furthermore, since the releasable connection 3 is located at the second end section 4b of strap 4, the strap 4 remains connected to the horse's halter, even after having been released, which makes it far easier to catch the horse once released.

The length of the strap extending between the moveable and fixed objects, when the releasable securing arrangement 1 is in use, may be regulated by means of, e.g., having more than two interlocking parts and where one of the interlocking parts can interlock with several other interlocking parts. The length may also be regulated by means of a regulating buckle or clasp attached to the strap 4, preferably located between the hook arrangement 2 and the first 3a interlocking part.

The releasable connection 3 may comprise a hook-and-loop fastener, wherein the first interlocking part 3a forms the hook part and the second interlocking part 3b forms the loop part, or vice versa. When the releasable connection 3 comprises more than two interlocking parts, one of the interlocking parts may be a hook part or a loop part, and the remaining interlocking parts, correspondingly, all being loop parts or hook parts.

The sound which is generated as the hook-and-loop fastener opens, in combination with the release of resistance, has a calming effect on a panicking horse and the escape attempt subsides, at least partially. One of the first 3a and second 3b interlocking parts may comprise a section which is not attached to the strap 4, i.e. which protrudes from the strap 4 when not interlocked, and which can be folded over the remaining section of the interlocking part (not shown). In an embodiment comprising such a foldable first 3a interlocking part, the second interlocking part 3b will be arranged between the two sections of the first interlocking part 3a, such that the second interlocking part 3b is sandwiched between two sections of the first interlocking part 3a when the releasable securing arrangement 1 is in the closed configuration.

The releasable connection 3 may also comprise a first permanent magnet and at least one of a second permanent magnet and a magnetic material. The first interlocking part 3a may comprise a first permanent magnet, whereby the second interlocking part 3b comprises at least one second permanent magnet or piece(s) of magnetic material. Correspondingly, the second interlocking part 3b may comprise a first permanent magnet, whereby the first interlocking part 3a comprises at least one second permanent magnet or piece(s) of magnetic material. When the releasable connection 3 comprises more than two interlocking parts, one of the interlocking parts may comprise a first permanent magnet, and the remaining interlocking parts, correspondingly, all comprise second permanent magnets or pieces of magnetic material.

The releasable connection 3 may furthermore comprise a self-openable buckle or clasp, providing an extra level of security to the connection by executing the release in two separate steps.

The releasable connection 3 opens, i.e. the releasable securing arrangement 1 changes from the closed configuration shown in FIGS. 2 and 4 to the open configuration shown in FIGS. 1 and 3, when a force is applied onto the releasable connection 3 which exceeds a predetermined force limit, the force separating the first interlocking part 3a from the second interlocking part 3b.

The force applied onto the releasable connection may be shear force. In one embodiment, the releasable connection 3 has a shear strength of at least 600 N. Preferably, the first 3a and second 3b interlocking parts of the releasable connection 3 unlock at a shear force of 650 N±20%.

However, the strength of the releasable connection 3 may be varied to suit different requirements, such as having a lower force limit for smaller and/or weaker animals, such as ponies, or horses which panic easily when being tied up. Furthermore, the strength of the releasable connection 3 may be varied by means of adjusting the surface area of the first 3a and second 3b interlocking parts. The first 3a and second 3b interlocking parts may have a longer length, seen along the longitudinal direction of the strap 4, than width, seen in a direction perpendicular to the longitudinal direction of the strap 4. Furthermore, the first 3a and second 3b interlocking parts may have a shorter length than width. In one embodiment, the surface area of each interlocking part is more than 3 cm². In one embodiment, the surface area of each interlocking part is between 60-80 cm².

The second end section 4b of the strap 4 may comprise a strap loop 5, allowing a user to easily and securely grasp the second end section 4b of the strap 4 in order to open the releasable connection 3, preferably using only one hand. The strap loop 5 is not part of the actual releasable connection 3, but provides an additional means for holding the strap at its very end.

In one embodiment, the releasable securing arrangement 1 comprises a protective cover 6 enclosing at least the first end section 4a of the strap 4. The protective cover 6 may comprise of shrink wrap, which functions both as protection for the first end section 4a of the strap 4, protecting the webbing as well as any seams used, and as sound-dampening, at least partially reducing the noise made by the releasable securing arrangement 1, e.g., when resting against a wall.

In a further embodiment, shown in FIGS. 3 and 4, the releasable securing arrangement 1 comprises a three-dimensional body 7 arranged along the first end section 4a of the strap 4. The three-dimensional body 7 may have any suitable shape, e.g., be shaped as a sphere or any kind of ellipsoid. The three-dimensional body 7 is preferably made of elastic material. The three-dimensional body 7 may comprise a throughgoing channel through which the first end section 4a of the strap 4 extends.

As an example, the releasable securing arrangement 1 may comprise a hook arrangement 2 having a minimum breaking strength of 24 000 N, and/or a strap 4 having at least one of a thickness of about 1 mm, a weight of about 39 g/m, and a tension strength of about 14 560 N. As a further example, the hook arrangement 2 may have a minimum breaking strength of 5 800 N and/or the strap 4 may have at least one of a thickness of up to 4 mm and a weight of up to 350 g/m. The tension strength of the strap 4 may be minimum 5 800 N.

The various aspects and implementations have been described in conjunction with various embodiments herein. However, other variations to the disclosed embodiments can be understood and effected by those skilled in the art in practicing the claimed subject-matter, from a study of the drawings, the disclosure, and the appended claims. In the claims, the word "comprising" does not exclude other elements or steps, and the indefinite article "a" or "an" does not exclude a plurality. The mere fact that certain measures are recited in mutually different dependent claims does not indicate that a combination of these measured cannot be used to advantage.

The reference signs used in the claims shall not be construed as limiting the scope.

What is claimed is:

1. A releasable securing tether for securing a horse to a fixed object, comprising:
   a single piece unitary strap consisting of a single piece webbing, the single piece strap having a first end and a second end;
   the first end of the strap comprising an openable and closeable hook configured to be removably attached to a halter that is secured to the horse,
   the second end of the strap comprising:
   a first interlocking part disposed on a first side of the strap, the first interlocking part having a length along a longitudinal direction of the strap and a width in a direction perpendicular to the length;
   a second interlocking part disposed on the first side of the strap, the second interlocking part having a length along the longitudinal direction of the strap and a width in a direction perpendicular to the length;
   a foldable strap portion of the single strap disposed between the first interlocking part and the second interlocking part, the foldable strap portion configured to form an opening when the first interlocking part and the second interlocking part are joined together in a closed configuration, enabling the fixed object to extend through the opening;
   said first interlocking part being longitudinally spaced from said second interlocking part on the first side of the strap by the foldable strap portion, wherein a thickness of the first interlocking part and a thickness of the second interlocking part is greater than a thickness of the foldable strap portion,
   a loop member disposed on the first side of the strap at an end of the second end section of the strap, the loop member being disposed adjacent to the second interlocking part of the strap and when the first interlocking part and the second interlocking part are in the closed configuration the fixed object the loop member is disposed against the first side of the strap adjacent to an end of the first interlocking part away from the foldable strap member; and wherein the first interlocking part and the second interlocking part are joined together, the first interlocking part and the second interlocking part interlock at one side of the fixed object, the foldable strap portion being wound around an other side of the fixed object; and when the first interlocking part and the second interlocking part are interlocked, said interlocked first interlocking part and the second interlocking part are configured to separate from one another when a movement of the horse causes a shear force to be exerted onto the strap in the longitudinal direction, the first interlocking part and the second interlocking part configured to be rejoined and interlocked in a reusable manner after separating.

2. The releasable securing arrangement according to claim 1, wherein said second end section of said strap comprises a strap loop.

3. The releasable securing arrangement according to claim 1, further comprising a protective cover enclosing at least said first end section of said strap.

4. The releasable securing arrangement according to claim 3, wherein said protective cover comprises shrink wrap.

5. The releasable securing arrangement according to claim 1, further comprising a three-dimensional body arranged along said first end section of said strap.

6. The releasable securing arrangement according to claim 5, wherein said three-dimensional body is made of elastic material.

7. The releasable securing arrangement according to claim 1, wherein said hook comprises a safety hook.

8. The releasable securing arrangement according to claim 1, wherein said releasable connection generates a sound when said interlocked first interlocking part and the second interlocking part separate.

9. A method of releasably securing a horse to a fixed object, the method comprising:

attaching a hook to a halter that is secured to the horse, the hook being attached to a first end of a single piece unitary strap consisting of a single piece webbing;

attaching a second end of the strap to a fixed object by:
joining a first interlocking part attached to a first side of the strap to a second interlocking part attached to the first side of the strap to lock the first interlocking part to the second interlocking part, wherein the joining of the first interlocking part to the second interlocking causes a foldable strap portion between the first interlocking part and the second interlocking part to form an opening through which the fixed object can extend;

said first interlocking part being longitudinally spaced from said second interlocking part on the first side of the strap by the foldable strap portion, wherein a thickness of the first interlocking part and a thickness of the second interlocking part is greater than a thickness of the foldable strap portion; and releasing the first interlocking part from the second interlocking part when a movement of the horse causes a shear force to be exerted onto the strap in a longitudinal direction in a manner that does not break the first interlocking part and the second interlocking part and enables the first interlocking part and the second interlocking part to be rejoined and interlocked in a reusable manner.

10. The method according to claim 9 the method further comprising releasing the first interlocking member from the second interlock member when a force is applied to a loop member disposed on the first side of the strap at an end of the second end section of the strap, the loop member being disposed adjacent to the second interlocking part of the strap, wherein the loop member is positioned against the first side of the strap at an end of the first interlocking part that is away from the foldable strap area when the foldable strap is wound around the fixed object.

11. The tether of claim 1, wherein the shear force is at least 650 N±20%.

12. The method of claim 9, wherein the shear force is at least 650 N±20%.

\* \* \* \* \*